(12) United States Patent
Shen et al.

(10) Patent No.: US 10,949,709 B2
(45) Date of Patent: Mar. 16, 2021

(54) METHOD FOR DETERMINING SENTENCE SIMILARITY

(71) Applicant: YUTOU TECHNOLOGY (HANGZHOU) CO., LTD., Hangzhou (CN)

(72) Inventors: Lei Shen, Hangzhou (CN); Jiansong Chen, Hangzhou (CN)

(73) Assignee: YUTOU TECHNOLOGY (HANGZHOU) CO., LTD., Hangzhou (CN)

( * ) Notice: Subject to any disclaimer, the term of this patent is extended or adjusted under 35 U.S.C. 154(b) by 100 days.

(21) Appl. No.: 16/488,572

(22) PCT Filed: Jan. 26, 2018

(86) PCT No.: PCT/CN2018/074336
§ 371 (c)(1),
(2) Date: Aug. 23, 2019

(87) PCT Pub. No.: WO2018/153217
PCT Pub. Date: Aug. 30, 2018

(65) Prior Publication Data
US 2020/0193217 A1    Jun. 18, 2020

(30) Foreign Application Priority Data

Feb. 27, 2017 (CN) .......................... 201710109324.2

(51) Int. Cl.
*G06K 9/00* (2006.01)
*G06K 9/62* (2006.01)
(Continued)

(52) U.S. Cl.
CPC ........... *G06K 9/6215* (2013.01); *G06F 17/16* (2013.01); *G06K 9/629* (2013.01); *G06N 3/0454* (2013.01);
(Continued)

(58) Field of Classification Search
CPC ...... G06K 9/346; G06K 9/348; G06K 9/6215; G06K 9/629; G06K 9/66; G06K 9/4628;
(Continued)

(56) References Cited

U.S. PATENT DOCUMENTS 6,137,911 A * 10/2000 Zhilyaev ............... G06F 16/353
382/225
6,233,354 B1 * 5/2001 Nakatani .................. G06K 9/03
382/224
(Continued)

FOREIGN PATENT DOCUMENTS

| CN | 101566998 A | 10/2009 |
|---|---|---|
| CN | 104834735 A | 8/2015 |
| CN | 105183714 A | 12/2015 |

OTHER PUBLICATIONS

Lian et al., "Multi-layer attention neural network for sentence semantic matching", Dec. 2019, ACM.*
(Continued)

*Primary Examiner* — Amir Alavi
(74) *Attorney, Agent, or Firm* — Getech Law LLC; Jun Ye

(57) ABSTRACT

The invention discloses a sentence similarity judgment method, which belongs to the technical field of natural language processing. The method comprises: according to two externally input sentence samples, respectively obtaining a character/word vector matrix in each sentence sample; respectively extracting overlapped features in each sentence sample to form an overlapped feature matrix, and combining the corresponding character/word vector matrix with the overlapped feature matrix for each sentence sample to serve as input data of the first neural network model; respectively processing according to the first neural network model to obtain the sentence vector for each sentence sample, then processing the sentence vectors to form a sentence combi-
(Continued)

nation vector, and combining the sentence combination vector with an overlapped feature vector formed according to the overlapped features to serve as the input data of the second neural network model; and processing according to the second neural network model to obtain a similarity metric associated with the two sentence samples, and outputting the similarity metric to serve as a basis for determining the similarity of the two sentence samples. The above technical solution has the beneficial effect of providing a method for determining sentence similarity, which can be used for solving the problem that the calculation of sentence similarity heavily depends on the quality of pre-trained character/word vectors and unregistered words in the prior art, thereby improving the measurement method for the calculation of sentence similarity.

8 Claims, 5 Drawing Sheets

(51) Int. Cl.
*G06N 20/20* (2019.01)
*G06N 20/10* (2019.01)
*G06F 17/16* (2006.01)
*G06N 3/04* (2006.01)
*G06N 3/08* (2006.01)

(52) U.S. Cl.
CPC .............. *G06N 3/08* (2013.01); *G06N 20/10* (2019.01); *G06N 20/20* (2019.01)

(58) Field of Classification Search
CPC ........ G06K 9/32; G06K 9/2013; G06K 9/344; G06K 9/342; G06K 9/34; G06F 17/16; G06N 20/20; G06N 20/10
See application file for complete search history.

(56) References Cited

U.S. PATENT DOCUMENTS

| | | | |
|---|---|---|---|
| 6,810,376 B1 | 10/2004 | Guan et al. | |
| 7,043,094 B2 * | 5/2006 | Thomas | G06K 9/342 382/305 |
| 7,644,047 B2 * | 1/2010 | Assadian | G06F 40/247 706/1 |
| 7,646,940 B2 * | 1/2010 | Chellapilla | G06K 9/00422 382/305 |
| 8,176,054 B2 * | 5/2012 | Moraleda | G06K 9/4685 707/743 |
| 8,352,263 B2 * | 1/2013 | Li | G10L 15/10 704/243 |
| 9,607,245 B2 * | 3/2017 | Tariq | G06K 9/6202 |
| 10,268,676 B1 * | 4/2019 | Meisner | G06F 40/232 |
| 10,437,936 B2 * | 10/2019 | DeFelice | G06F 40/56 |
| 2019/0065506 A1 * | 2/2019 | Li | G06F 16/3347 |
| 2020/0193217 A1 * | 6/2020 | Shen | G06F 40/20 |

OTHER PUBLICATIONS

PCT/CN2018/074336—International Search Report, dated Apr. 27, 2018, 3 pages in Chinese, 2 pages English translation.
PCT/CN2018/074336—Written Opinion, dated Apr. 27, 2018, 3 pages.

* cited by examiner

METHOD FOR DETERMINING SENTENCE SIMILARITY

FIELD OF THE INVENTION

The present invention relates to the technical field of natural language processing, and in particular to a method for determining sentence similarity.

BACKGROUND OF THE INVENTION

In the technical field of natural language processing, the application of determining the similarity between two sentences is very extensive. In the prior art, the similarity between the two sentences is usually calculated by using the following method as shown in FIG. 1:

For a sentence 1 and a sentence 2, by respectively obtaining character/word vector matrices of the two sentences at first, inputting the character/word vector matrices into a deep neural network model, obtaining sentence vectors through the processing of a deep neural network, and splicing the sentence vectors to serve as the input of a classification neural network model, a similarity metric of the two sentences can be finally obtained.

In the above processing method, when the similarity between the sentences is calculated, the character/word vector matrices are formed by mapping character/word sequences in the sentences, the parameters thereof are generally initialized by character/word vectors formed by the pre-training of a language model, so the parameter quality heavily depends on the quality of the pre-trained character/word vectors. Moreover, if the sentences contain characters or words (i.e., unregistered words) absent in a character/word vector dictionary, the characters or words are mapped into random vectors for calculation, thereby affecting the measurement effect of the model.

SUMMARY OF THE INVENTION

According to the above problems existing in the prior art, a technical solution is provided for a method for determining sentence similarity, in order to solve the problem that the calculation of sentence similarity heavily depends on the quality of pre-trained character/word vectors and unregistered words in the prior art, thereby improving the measurement method for the calculation of sentence similarity.

The above technical solution specifically includes:

A method for determining sentence similarity includes: forming a sentence similarity determining model through pre-training, wherein the sentence similarity determining model includes a first neural network model used for processing to obtain a sentence vector and a second neural network model used for processing to obtain a similarity metric representing the sentence similarity;

the method for determining sentence similarity further includes:

step S1, according to two externally input sentence samples, respectively obtaining a character/word vector matrix in each sentence sample;

step S2, respectively extracting overlapped features in each sentence sample to form an overlapped feature matrix, and combining the corresponding character/word vector matrix with the overlapped feature matrix for each sentence sample to serve as input data of the first neural network model;

step S3, respectively processing according to the first neural network model to obtain the sentence vector for each sentence sample, then processing the sentence vectors to form a sentence combination vector, and combining the sentence combination vector with an overlapped feature vector formed according to the overlapped features to serve as the input data of the second neural network model; and step S4, processing according to the second neural network model to obtain a similarity metric associated with the two sentence samples, and outputting the similarity metric to serve as a basis for determining the similarity of the two sentence samples; and in the step S3, the sentence combination vector is formed by directly subtracting the sentence vectors, or, the sentence combination vector is formed by splicing the sentence vectors.

Preferably, according to the method for determining sentence similarity, wherein in the step S1, the character/word vector matrix of each sentence sample includes:

a character vector matrix of each sentence sample; or a word vector matrix of each sentence sample;

and in the step S1:

dividing the sentence sample into character sequences, and mapping the character sequences into the character vector matrix; or dividing the sentence sample into word sequences, and mapping the word sequences into the word vector matrix.

Preferably, according to the method for determining sentence similarity, wherein in the step S2, the overlapped feature matrix is formed in the following processing manner:

step S21, respectively replacing mutually overlapped characters or words in the two sentence samples with a first character;

step S22, respectively replacing characters or words that do not overlap in the two sentence samples with a second character;

step S23, respectively forming an overlapped feature sequence associated with each sentence sample according to the first character and the second character;

step S24, mapping each overlapped feature sequence into the overlapped feature matrix; and step S25, respectively combining each character/word vector matrix with the corresponding overlapped feature matrix to serve as the input data of the first neural network model.

Preferably, according to the method for determining sentence similarity, wherein in the step S3, processing to obtain a similarity product of the two sentence vectors, then carrying out a subtraction operation on the two sentence vectors, and combining the subtracted vector with the similarity product and the overlapped feature vector to serve as the input data of the second neural network.

Preferably, according to the method for determining sentence similarity, wherein the similarity product is obtained by calculating a dot product between the two sentence vectors; or the similarity product is obtained by processing according to a parameter matrix;

while in the process of training the sentence similarity determining model in advance, the parameter matrix is obtained by simultaneous training.

Preferably, according to the method for determining sentence similarity, wherein the first neural network model is a deep neural network model.

Preferably, according to the method for determining sentence similarity, wherein the first neural network model is a convolutional neural network model or a recurrent neural network model.

Preferably, according to the method for determining sentence similarity, wherein the second neural network model is a classification neural network model.

The above technical solution has the beneficial effect of providing a method for determining sentence similarity, which can be used for solving the problem that the calculation of sentence similarity heavily depends on the quality of pre-trained character/word vectors and unregistered words in the prior art, thereby improving the measurement method for the calculation of sentence similarity.

DETAILED DESCRIPTION OF THE EMBODIMENTS

A clear and complete description of technical solutions in the embodiments of the present invention will be given below, in combination with the drawings in the embodiments of the present invention. Apparently, the embodiments described below are merely a part, but not all, of the embodiments of the present invention. All of other embodiments, obtained by those of ordinary skill in the art based on the embodiments of the present invention without any creative effort, fall into the protection scope of the present invention.

It should be noted that the embodiments in the present invention and the features in the embodiments can be combined with each other without conflict.

The present invention is further illustrated below in combination with the drawings and specific embodiments, but the present invention is not limited thereto.

According to the above problems existing in the prior art, a method for determining sentence similarity is provided, in the determining method, a sentence similarity determining model can be formed by pre-training, and the sentence similarity determining model includes a first neural network model used for processing to obtain a sentence vector and a second neural network model used for processing to obtain a similarity metric representing the sentence similarity.

Specifically, the first neural network model and the second neural network model are integrally formed by unified training, that is, the sentence similarity determining model including the first neural network model and the second neural network model is established at first (the output of the first neural network model is used as the input of the second neural network model), and then the carrying out training by inputting training samples to the first neural network model to form the complete sentence similarity determining model.

Figure 2:
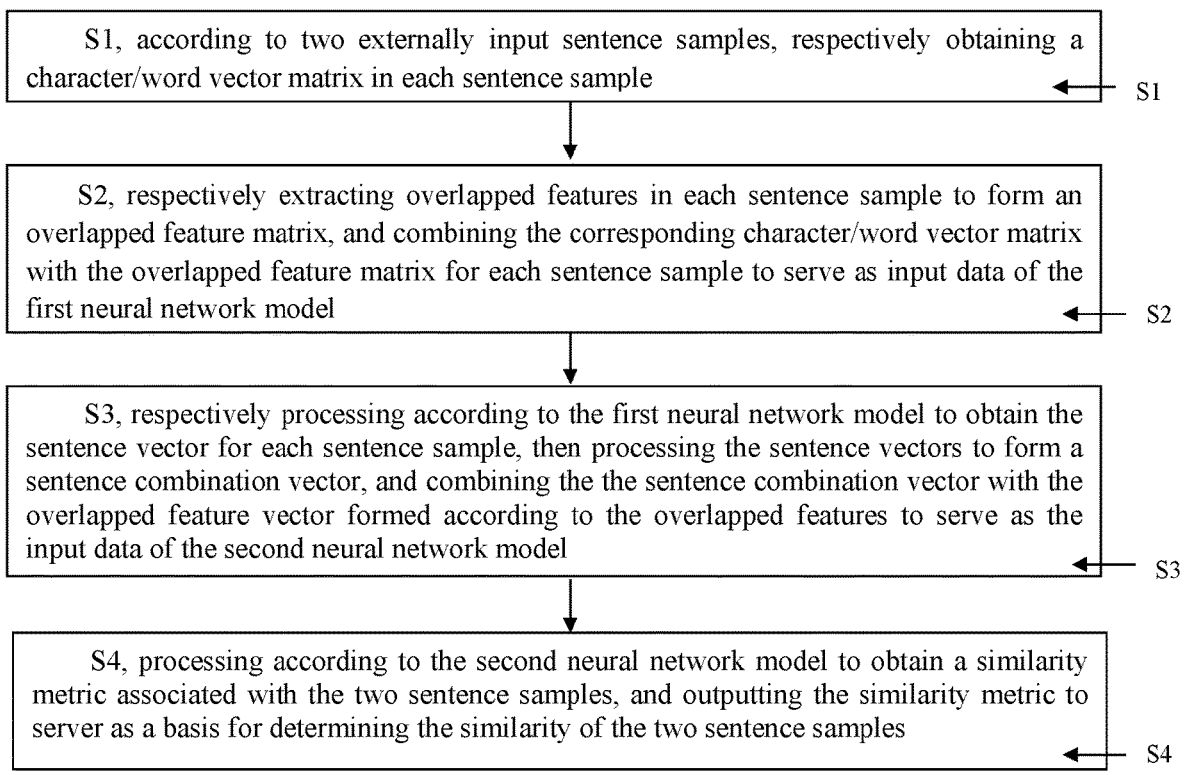
FIG. 2-FIG. 3 are schematic diagrams of an overall flow of a method for determining sentence similarity in a preferred embodiment of the present invention.

The method, specifically as shown in FIG. 2, includes:

step S1, according to two externally input sentence samples, respectively obtaining a character/word vector matrix in each sentence sample;

step S2, respectively extracting overlapped features in each sentence sample to form an overlapped feature matrix, and combining the corresponding character/word vector matrix with the overlapped feature matrix for each sentence sample to serve as input data of the first neural network model;

step S3, respectively processing according to the first neural network model to obtain the sentence vector for each sentence sample, carrying out an operation to form a sentence combination vector, and combining the same with the overlapped feature vector formed according to the overlapped features to serve as the input data of the second neural network model; and step S4, processing according to the second neural network model to obtain a similarity metric associated with the two sentence samples, and outputting the similarity metric to serve as a basis for determining the similarity of the two sentence samples.

In the step S3, the sentence combination vector is formed by directly subtracting the sentence vectors, or, the sentence combination vector is formed by splicing the sentence vectors.

Specifically, in the present embodiment, for two given sentence samples, the character/word vector matrix in each sentence sample is respectively obtained at first. The so-called character/word vector matrix refers to a matrix formed by mapping character/word vectors in a sentence.

Then, in the present embodiment, the overlapped features in each sentence sample are obtained to form the overlapped feature matrix, the overlapped feature is an overlapped character/word feature extracted according to mutually overlapped characters/words in the two sentence samples, and the overlapped feature matrix is a matrix formed by mapping the overlapped features according to the same mapping method of forming the character/word vector matrix.

In the present embodiment, after the character/word vector matrix and the overlapped feature matrix are obtained, the two matrices associated with the same sentence sample are combined to serve as the input data of the first neural network model, and then the processing is carried out according to the first neural network model to obtain the sentence vector for each sentence sample.

In a preferred embodiment of the present invention, a subtraction operation is carried out on the sentence vectors of the two sentence samples, and the specific method of the subtraction operation is detailed below. Furthermore, an overlapped feature vector is formed for the overlapped features obtained above and is combined with the formed sentence combination vector to server as the input data of the second neural network model.

In another preferred embodiment of the present invention, a splicing operation is carried out on the sentence vectors of the two sentence samples, and the specific method of the splicing operation is the same as that in the prior art. Furthermore, an overlapped feature vector is formed for the overlapped features obtained above and is combined with the formed sentence combination vector to serve as the input data of the second neural network model.

In the present embodiment, a similarity metric of the two sentence samples is finally obtained through processing according to the second neural network model, and is served as the basis for determining the similarity of the two sentence samples.

Figure 1:
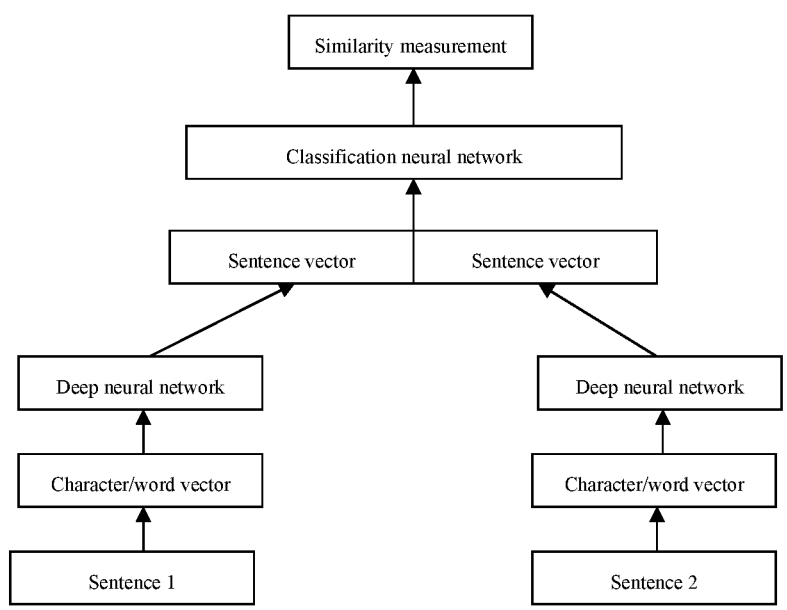
FIG. 1 is a flow schematic diagram of processing to obtain sentence similarity in the prior art.
Figure 3:
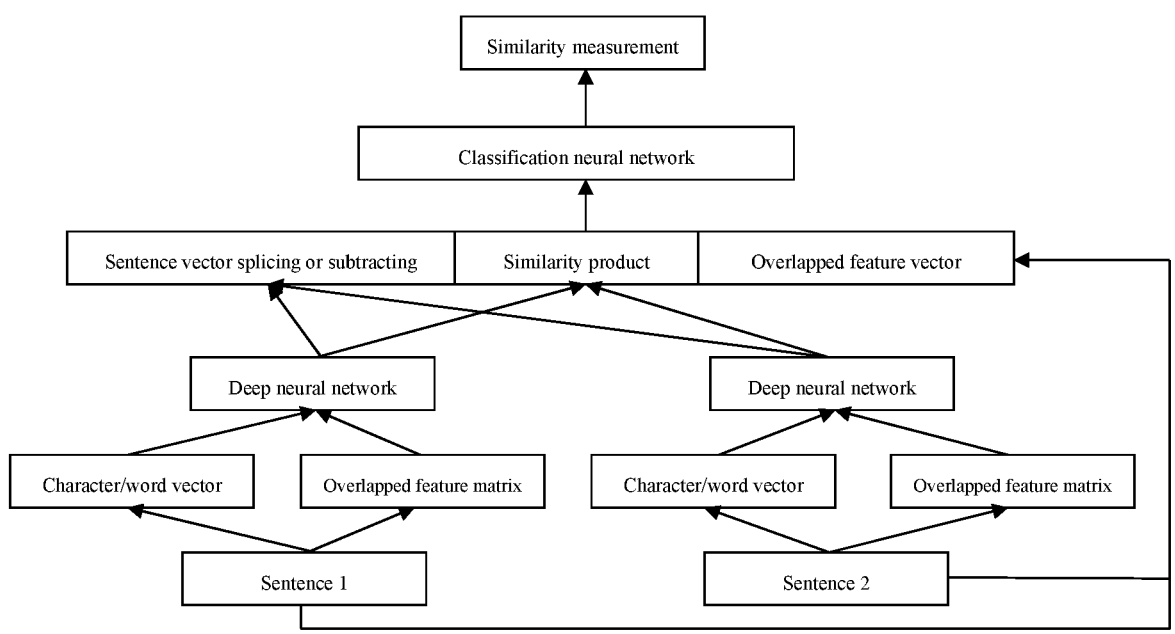

In a preferred embodiment of the present invention, compared with the method for determining the sentence similarity in the prior art (as shown in FIG. 1), an improved portion of the technical solution of the present invention is shown in FIG. 3. The main improvement is that the overlapped features of two sentences are introduced, the overlapped features are processed to serve as the input data (overlapped feature matrix) of the first neural network model and the input data (overlapped feature vector) as the second neural network model, respectively. Therefore, the neural network models scarcely depend on the quality of the pre-trained character/word vectors, and the problem of unregistered words is solved. Meanwhile, the splicing manner of the sentence vectors in the prior art is changed into either splicing or subtracting. The above method improves the model for calculating the sentence similarity, and finally improves the measurement method for calculating the sentence similarity.

In a preferred embodiment of the present invention, in the step S1, the character/word vector matrix of each sentence sample includes:

a character vector matrix of each sentence sample; or
a word vector matrix of each sentence sample.

That is, the character/word vector matrix includes the character/word vector matrix of each sentence sample.

Then, in the present embodiment, in the step S1:

dividing the sentence sample into character sequences, and mapping the character sequences into the character vector matrix; or dividing the sentence sample into word sequences, and mapping the word sequences into the word vector matrix.

Figure 4:
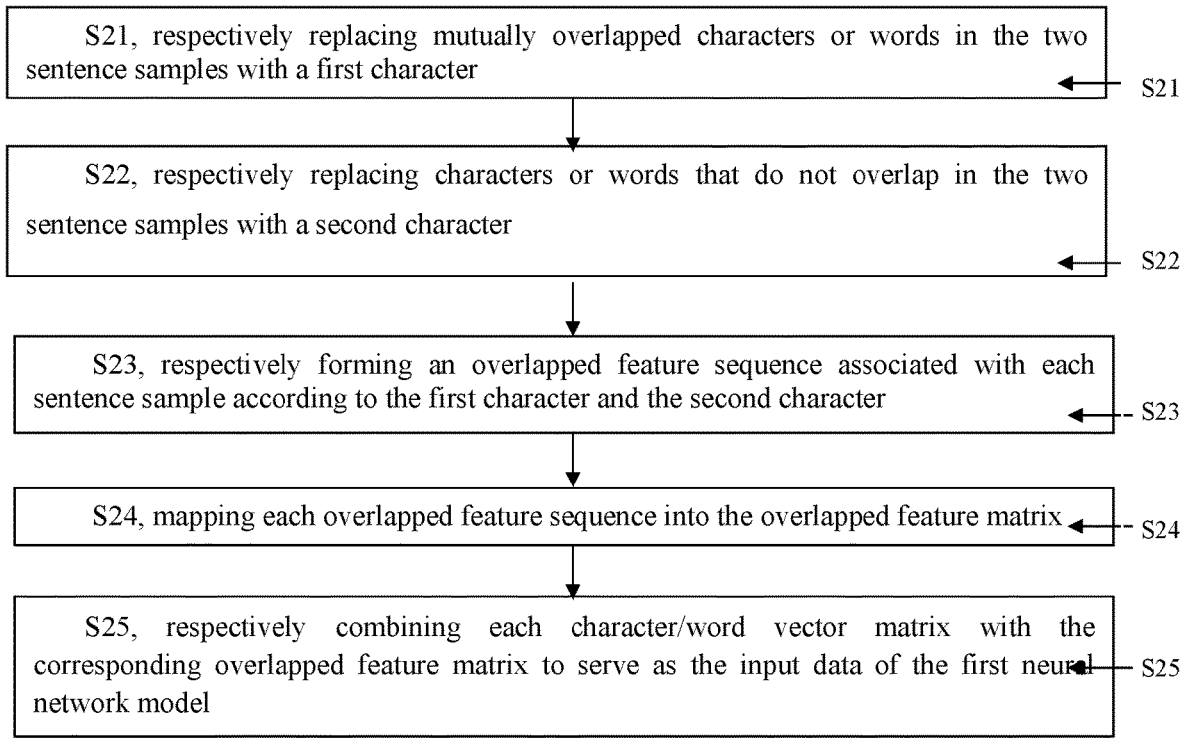
FIG. 4 is a schematic diagram of a specific flow of forming an overlapped feature matrix in a preferred embodiment of the present invention.

In a preferred embodiment of the present invention, in the step S2, the overlapped feature matrix is formed in the following processing manner as shown in FIG. 4:

step S21, respectively replacing mutually overlapped characters or words in the two sentence samples with a first character;

step S22, respectively replacing characters or words that do not overlap in the two sentence samples with a second character;

step S23, respectively forming an overlapped feature sequence associated with each sentence sample according to the first character and the second character;

step S24, mapping each overlapped feature sequence into the overlapped feature matrix; and step S25, respectively combining each character/word vector matrix with the corresponding overlapped feature matrix to serve as the input data of the first neural network model.

Specifically, in the present embodiment, in the above steps, in order to facilitate the processing by a computer, the first character can be 1 and the second character can be 0, and a binary overlapped feature vector associated with each sentence sample can be formed. For example, for two sentence samples "我要听歌 (I want to listen to songs)" and "给我放首歌 (Play a song for me)", the mutually overlapped parts (i.e., the overlapped features) are "我 (me)" and "歌 (song)" respectively, then the overlapped feature sequence for "我要听歌" is 1001, the overlapped feature sequence for "给我放首歌" is 01001, then the above two overlapped feature sequences 1001 and 01001 are respectively mapped to form an overlapped feature matrix according to the same method of mapping according to the character/word vectors to form the character/word vector matrix, that is, the character 0 is mapped into a one-dimensional vector, the character 1 is mapped into a one-dimensional vector, and then the matrix is formed, and the character/word vector matrix and the overlapped feature matrix of each sentence sample are combined to serve as the input data of the first neural network model.

In other embodiments of the present invention, the first character and the second character can also be processed in other suitable processing manners, which are not repeatedly described herein.

In a preferred embodiment of the present invention, in the step S3, the forming manner of the overlapped feature vectors can include several following manners:

1) s1 represents one sentence sample, s2 represents the other sentence sample, IDF_overlap represents the sum of IDF (Inverse Document Frequency) of the mutually overlapped characters/words in the two sentence samples, and length represents the sentence length of each sentence sample, then the overlapped feature vector feat can be expressed as feat=IDF_overlap/(length(s1)+length(s2)).

In the above description, the IDF number of a particular character/word can be obtained by dividing the total number of files by the number of files containing the character/word, and then taking the logarithm of the obtained quotient, which will not be described repeatedly below.

2) Similarly, s1 represents one sentence sample, s2 represents the other sentence sample, IDF_overlap represents the sum of IDF of the mutually overlapped characters/words in the two sentence samples, and IDF_sum represents the sum of IDF of all characters/words in each sentence sample, then the overlapped feature vector feat can be expressed as feat=IDF_overlap/(IDF_sum(s1)+IDF_sum(s2)).

3) Similarly, s1 represents one sentence sample, s2 represents the other sentence sample, length represents the sentence length of each sentence sample, and word_overlap represents the number of overlapped characters in the two sentence samples, then the overlapped feature vector feat can be expressed as feat=word_overlap/(length(s1)+length(s2)).

The overlapped feature vector can be obtained by the above three methods, and the overlapped feature vector is directly spliced in the input data of the second neural network model.

In a preferred embodiment of the present invention, when the overlapped feature vector is calculated, stop words in the sentence can be removed at first, and then the overlapped feature vector is calculated. The so-called stop words mainly include English characters, numbers, mathematical characters, punctuation marks and single Chinese characters with extremely high frequency and the like, if a stop word is encountered during text processing, the processing is stopped immediately, and the stop word is thrown away.

Figure 5:
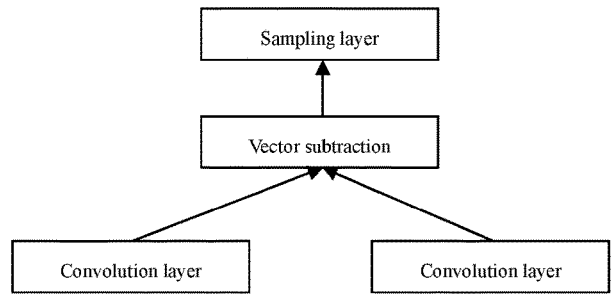
FIG. 5 is a structural schematic diagram of a first neural network model in a preferred embodiment of the present invention.

In a preferred embodiment of the present invention, in the step S3, the difference between the two sentence vectors can be better discovered by carrying out the subtraction operation on the two sentence vectors (as shown in FIG. 3). Further, the subtraction operation of the two sentence vectors can be implemented in the following several manners:

1) the two sentence vectors are directly subtracted to obtain the result;

2) the two sentence vectors are subtracted, and then an absolute value is taken to obtain the result; and 3) the first neural network model can be a convolutional neural network model, and the convolutional neural network is divided into a convolution layer and a sampling layer (as shown in FIG. 5), then two vectors can be subtracted by directly using one of the two above manners after processing is carried out on the convolution layer, then sampling is carried out on the sampling layer, and the result is obtained at last.

In a preferred embodiment of the present invention, in the step S3, while the two sentence vectors are processed in the subtraction manner, a similarity product of the two sentence vectors is obtained by processing, and the similarity product, the subtraction result of the sentence vectors and the overlapped feature vector are combined to serve as the input data of the second neural network (as shown in FIG. 3).

Specifically, the above similarity product can be obtained in the following several processing manners:

1) calculating a dot product of two sentence vectors to serve as the above similarity product; and 2) introducing a parameter matrix M, respectively representing the two sentence vectors with x and y, then the similarity product can be expressed as x*M*y. In a preferred embodiment of the present invention, the parameter matrix M can be formed by training while the sentence similarity determining model is formed by training (i.e., when the first neural network model and the second neural network model are formed by unified training).

In other embodiments of the present invention, in the step S3, the subtraction operation may be not carried out on the sentence vectors, but splicing processing is carried out on the two sentence vectors in a splicing manner of sentence vectors similar to that in the prior art, and the spliced sentence vector is combined with the overlapped feature vector formed according to the overlapped features to serve as the input data of the second neural network model (as shown in FIG. 3, in FIG. 3, the sentence vector splicing or sentence vector subtraction mode can be selected for processing).

In a preferred embodiment of the present invention, the first neural network model can be a deep neural network model, and can further be a convolutional neural network (CNN) model or a recurrent neural network (RNN) model, and can even be a variant of the recurrent neural network model, such as a long short term memory (LSTM) model or a gated recurrent unit (GRU).

Figure 6:
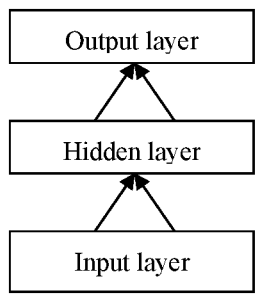
FIG. 6 is a structural schematic diagram of a second neural network model in a preferred embodiment of the present invention.

In a preferred embodiment of the present invention, the second neural network model can be a classification neural network model, a general structure of the second neural network model is shown in FIG. 6, the second neural network model can be divided into an input layer, a hidden layer and an output layer, the output layer is also a classification layer, the above hidden layer can also be removed, that is, only the input layer and the output layer (classification layer) exist.

The technical solution of the present invention provides a method for determining sentence similarity. In the method, the overlapped features of the sentence vectors are imported and respectively served as the input data of the deep neural network model and the classification neural network model, and the splicing process of the sentence vectors during the processing is changed into the subtraction operation process of the sentence vectors, so that the problem that the calculation of sentence similarity heavily depends on the quality of pre-trained character/word vectors and unregistered words in the prior art can be solved, thereby improving the measurement method for the calculation of sentence similarity.

It is worth noting that, under the premise of not considering the problem that the quality of similarity measurement heavily depends on the quality of pre-trained character/words and the unregistered words, some technical features of the technical solution of the present invention can be replaced or removed, and can still be used as a complete method for determining sentence similarity. For example:

1) the process of the subtraction operation on the sentence vectors can be modified into a splicing process of the sentence vectors in the traditional process, without affecting the progress of the overall determining process;

2) removing the overlapped feature matrix formed by the overlapped features from the input data of the first neural network model, and only using the overlapped feature vector formed by the overlapped features as the input data of the second neural network model, which does not affect the progress of the overall determining process as well;

3) removing the overlapped feature vector formed by the overlapped features from the input data of the second neural network model, and only using the overlapped feature matrix formed by the overlapped features as the input data of the first neural network model, which does not affect the progress of the overall determining process as well; and 4) removing the overlapped features, and only modifying the splicing operation of the sentence vectors in the prior art into the subtraction operation of the sentence vectors, which does not affect the progress of the overall determining process as well.

The method for determining sentence similarity provided in the technical solution of the present invention can be applicable to a scenario of "chat" between a user and a smart device. For example, when the user speaks a sentence to the smart device, the process in which the smart device gives a response through background processing is generally as follows: obtaining a preliminary candidate sentence set by alternative database search in the background of the smart device, and then obtaining a similar sentence associated with the sentence spoken by the user from the candidate sentence set by using the method for determining sentence similarity provided in the technical solution of the present invention, and then the answer corresponding to the similar sentence is fed back to the user.

The foregoing descriptions are merely preferred embodiments of the present invention, and thus are not intended to limit the implementation manner or the protection scope of the present invention, and those skilled in the art should be aware that all solutions obtained by making equivalent substitutions and obvious variations on the basis of the specification of the present invention and the contents shown in the figures shall fall within the protection scope of the present invention.

What is claimed is:

1. A method for determining sentence similarity, wherein a sentence similarity determining model is formed through pre-training, the sentence similarity determining model comprises a first neural network model used for processing to obtain a sentence vector and a second neural network model used for processing to obtain a similarity metric representing the sentence similarity;

the method for determining sentence similarity further comprises:

step S1, according to two externally input sentence samples, respectively obtaining a character/word vector matrix in each sentence sample;

step S2, respectively extracting overlapped features in each sentence sample to form an overlapped feature matrix, and combining the corresponding character/word vector matrix with the overlapped feature matrix for each sentence sample to serve as input data of the first neural network model;

step S3, respectively processing according to the first neural network model to obtain the sentence vector for each sentence sample, then processing the sentence vectors to form a sentence combination vector, and combining the sentence combination vector with an overlapped feature vector formed according to the overlapped features to serve as the input data of the second neural network model; and step S4, processing according to the second neural network model to obtain a similarity metric associated with the two sentence samples, and outputting the similarity metric to serve as a basis for determining the similarity of the two sentence samples;

in the step S3, the sentence combination vector is formed by directly subtracting the sentence vectors, or, the sentence combination vector is formed by splicing the sentence vectors.

2. The method for determining sentence similarity according to claim 1, wherein in the step S1, the character/word vector matrix of each sentence sample comprises:

a character vector matrix of each sentence sample; or
a word vector matrix of each sentence sample;
and in the step S1:
dividing the sentence sample into character sequences, and mapping the character sequences into the character vector matrix; or
dividing the sentence sample into word sequences, and mapping the word sequences into the word vector matrix.

3. The method for determining sentence similarity according to claim 1, wherein in the step S2, the overlapped feature matrix is formed by the following processing manner:

step S21, respectively replacing mutually overlapped characters or words in the two sentence samples with a first character;
step S22, respectively replacing characters or words that do not overlap in the two sentence samples with a second character;
step S23, respectively forming an overlapped feature sequence associated with each sentence sample according to the first character and the second character;
step S24, mapping each overlapped feature sequence into the overlapped feature matrix; and
step S25, respectively combining each character/word vector matrix with the corresponding overlapped feature matrix to serve as the input data of the first neural network model.

4. The method for determining sentence similarity according to claim 1, wherein in the step S3, processing to obtain a similarity product of the two sentence vectors, then carrying out a subtraction operation on the two sentence vectors, and combining the subtracted vector with the similarity product and the overlapped feature vector to serve as the input data of the second neural network.

5. The method for determining sentence similarity according to claim 4, wherein the similarity product is obtained by calculating a dot product between the two sentence vectors; or the similarity product is obtained by processing according to a parameter matrix;
while in the process of training the sentence similarity determining model in advance, the parameter matrix is obtained by simultaneous training.

6. The method for determining sentence similarity according to claim 1, wherein the first neural network model is a deep neural network model.

7. The method for determining sentence similarity according to claim 1, wherein the first neural network model is a convolutional neural network model or a recurrent neural network model.

8. The method for determining sentence similarity according to claim 1, wherein the second neural network model is a classification neural network model.

* * * * *